April 1, 1958
S. PALADINO ET AL
2,828,949
STIRRING DEVICE
Filed Oct. 17, 1955
2 Sheets-Sheet 1
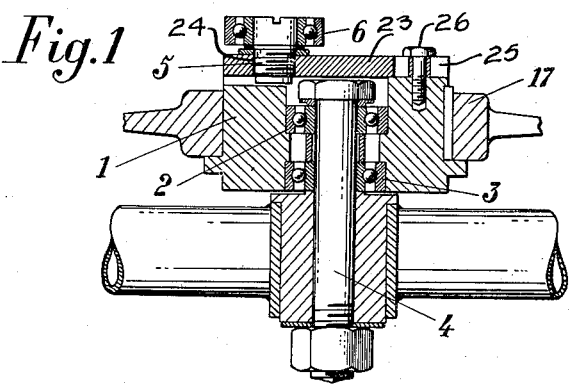
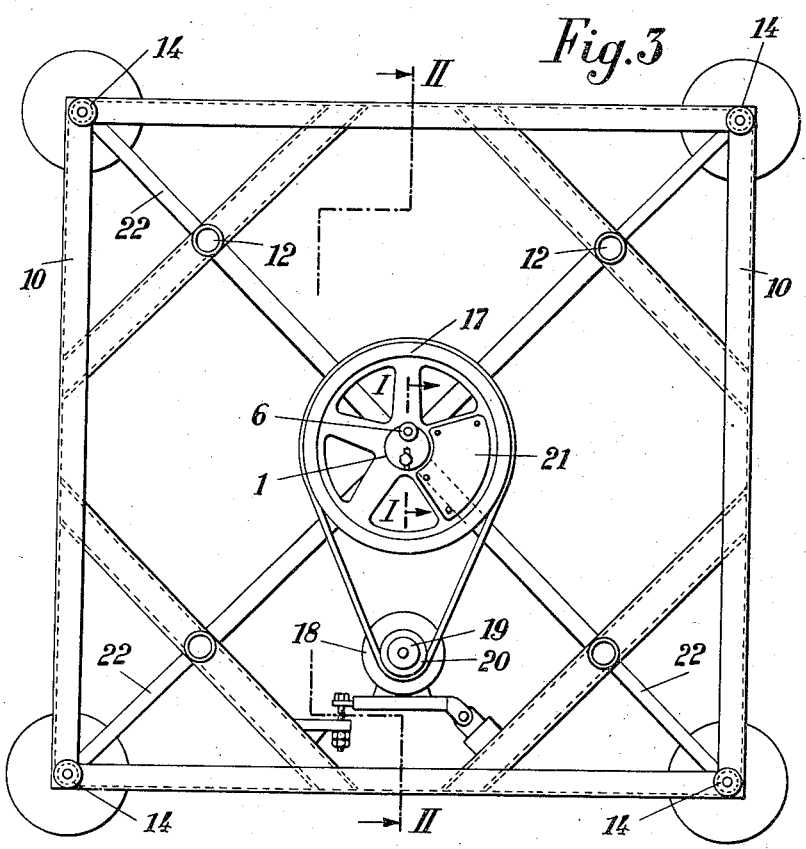
INVENTORS
SALVATORE PALADINO &
FRANCESCO UGOLINI
BY Wenderoth, Lind & Ponack
ATTORNEYS.

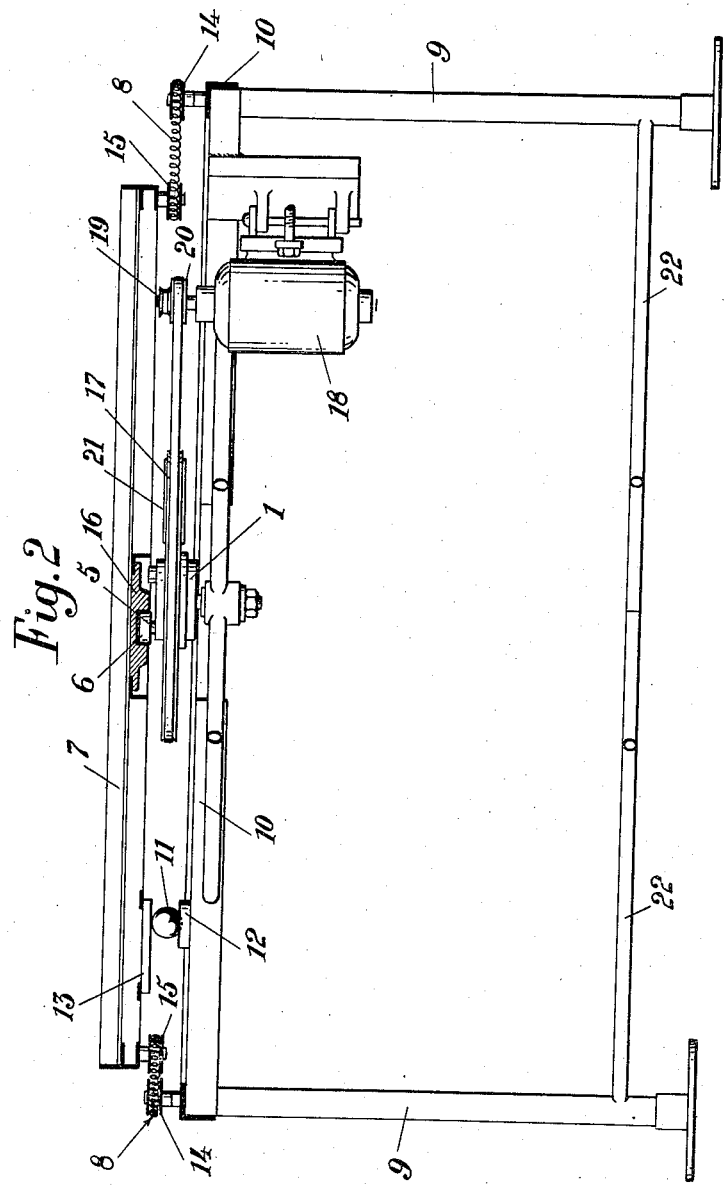

United States Patent Office 2,828,949
Patented Apr. 1, 1958

2,828,949

STIRRING DEVICE

Salvatore Paladino and Francesco Ugolini, Rome, Italy, assignors of one-third to Fondazione Emanuele Paternó, Rome, Italy, a company of Italy Application October 17, 1955, Serial No. 540,915

Claims priority, application Italy October 22, 1954

1 Claim. (Cl. 259—72)

The present invention relates to a stirring device having a level horizontal movement, said device having receptacles mounted thereon which contain substances or cultures to be kept under agitation in order to submit them to a transformation of either a chemical or biological nature, said transformation occurring with or without the cooperation of aeration, depending upon the shape of the receptacle, upon the speed given the liquid within the receptacle, upon the presence of plugs and upon the presence or absence, inside the receptacles, of a particular gaseous atmosphere.

Specifically, the stirring device according to this invention, completely fulfills the requirements both of stirring and of aeration of the biological cultures in a liquid medium, contained within glass flasks.

It is known that the stirring of a liquid contained within a receptacle can be obtained by giving the particles of the liquid either a linear reciprocation or a circular movement. In the first cited case, a stirring occurs which except for particular condition of the surface particles, such as their separation and the formation of a wave producing a surface aeration, is not apt to afford an effective aeration of the liquid; in the second cited case there is less aeration of the liquid, due to the smooth movement of the upper surface layers of the liquid in respect to the underlying layers.

Since in the case of the biological cultures, the stirring problem is always generally related to the aeration problem, obviously the stirring devices of the second cited type, which stir the liquid particles in a uniform circular movement are more important than those of the first cited type.

Moreover, the studies and the tests which have been carried out have demonstrated that the power efficiency of aeration and stirring for the liquids, the particles of which are stirred by a circular movement, is greater than that which is obtained when a linear reciprocation is given the particles of the liquids.

These studies and tests have resulted in the stirring and aerating devices where a free circular stirring with a central vortex is obtained being preferred over the anti-vortex systems, in the field of industrial fermentations.

Thus, also for the level stirring devices, particularly suitable for stirring and aerating liquid biological cultures contained within flasks, the rotational type stirring devices have been substituted for the old stirring devices which gave the flasks a linear level reciprocation.

The rotational devices have been studied and manufactured in several forms. Said devices according to the prior art, however, do not have the desirable resistance and operative features, in that they are continuously operating devices provided with linkages, and furthermore these devices do not allow the perfect reproduction of the experimental conditions in that the kinematic characteristics of any point on the flask-carrying plane are not constant, the value of both stirring and of aeration and the consequent growth of the micro-organisms depending on said characteristics.

The apparatus according to this invention, on the contrary, has, for any point on the flask-carrying plate, the same values of movement; its mechanical embodiment is particularly simple and rugged in that no mass having reciprocal movement is present, such as linkages or similar devices often being very noisy.

This invention will be further described with reference to the attached drawings showing both the basic principle of the device and a preferred embodiment thereof.

Figure 1 shows a detailed cross-sectional view of the actuating device for the flask-carrying plate, in order to disclose the operation of the unit;

Figure 2 shows a vertical cross-sectional view of the device taken along the line II—II of Figure 3, and Figure 3 shows on a reduced scale, a top plan view of the device of Figure 2, with the flask-carrying plate removed.

With reference to the drawings, and particularly to Figure 1, the basic principle of operation of this device is as follows: 1 is a vertical sleeve supported on the two bearings 2 and 3, for revolution about the vertical shaft 4. The sleeve 1 is provided with an upper movable portion 23 which is provided with a radial slot 25 to permit arranging the portion 23 eccentric with respect to the sleeve 1 and to fasten the said portion in the eccentric position by means of pin 26. The upper portion 23 is provided with a bore 24 wherein the pivot 5 may be fitted. This latter, in turn, carries a ball bearing 6 inserted in a support 16 rigid with the flask-carrying plate (not shown in Figure 1). When the sleeve 1 is rotated, and if the flask-carrying plate is prevented from rotating about the axis of the pivot 5, all of the points of said plate will have a circular movement having a radius equalling the amount of the eccentricity between the geometrical axes of the sleeve 1 and pivot 5. By varying the amount of said eccentricity, the radius of the circular path of the flask-carrying plate will also be varied and therefor, for a given number of revolutions of the sleeve 1, the peripheral speed of each point of said plate will be varied.

Obviously, the peripheral speed of any point of the plate can also be varied simply by varying the number of revolutions of the sleeve 1. However, in the devices of this kind it is preferred to use, as a power source, a three-phase electrical motor having a constant number of revolutions, the sleeve 1 being connected with said engine by a reduction gear. The adjustment of the peripheral speed of any point of the flask-carrying plate is obtained by the simple variation of the amount of the eccentricity between the sleeve 1 and pivot 5.

Figures 2 and 3 show, merely by way of example, one constructional embodiment of this device; it is to be noted that this embodiment is in no way the only possible one, as this device may be embodied in several other forms, without departing from the scope of this invention.

It is to be noted that, in the following specification, the several parts have been shown by the same reference numerals already used in connection with the description of Figure 1. This device comprises a flask-carrying plate 7 (Figure 2) having a size sufficient to hold the desired number of flasks. The plate is prevented from rotating about the central axis by the spring connections 8, arranged at the four corners of the plate, keeping said plate always parallel to the supporting stationary frame 9. The flask-carrying plate rests on the upper structure 10 of the frame 9 on four steel balls 11 seated in recesses 12 the dimensions of which will not permit escape of the balls, even if the flask-carrying plate moves through its maximum eccentricity.

The flask-carrying plate 7 rests on the balls 10 on four flat plates 13, the dimensions of which are not less than those of the corresponding recesses 12.

The elastic connections between the plate 7 and the stationary frame 9—10 are formed by rubber rings or helical ring-shaped springs 8 mounted around the opposed pairs of grooved pulleys 14 mounted on the stationary frame and grooved pulleys 15 mounted on the flask-carrying plate 7. The pulleys 15 are in pairs, the pulleys of each pair being at diagonally opposite ends of the flask carrying plate 7. Centrally under said flask-carrying plate 7 is fixed the support 16 for the ball bearing 6 wherein the pivot 5 is received. The pivot 5 slides in a radial groove provided in the top surface of the sleeve 1 and can be fixed, in a known way, in the desired eccentric position with respect to the axis of the sleeve 1. The latter is supported, by means of two bearings, on the stationary frame 10 and is rotated by the pulley 17 fixed on said sleeve and connected to the pulleys 19 or 20, according to the selected driving ratio, these latter pulleys being mounted on the shaft of the electric motor 18, supported by the frame 9 by means of a bracket. The pulley 17 carries the compensating mass 21, which is calculated on the basis of the dimensions of the flask-carrying plate and of the average load thereon applied.

A spider 22 serves for stiffening the frame 9.

It is obvious, from the preceding specification, that the movable plate moves along a circular path with a parallel movement, the radius of which can be continuously adjusted within pre-determined limits, while the peripheral speed, besides being determined by the amount of the eccentricity of the pivots with respect to one another, depends also upon the number of revolutions of the pivot fixed to the stationary frame, upon the value of the moment of inertia of the movable plate and upon the elasticity of the springs connected to the corners of said movable plate.

We claim:

A stirring device for providing level horizontal movement particularly for use with culture containing flasks, comprising the combination of a stationary supporting frame, a vertical shaft fastened to said frame, a sleeve rotatably mounted on said shaft, an upper movable portion slidably mounted on the upper end of said sleeve for sliding movement transversely of said vertical shaft, the axis of said upper movable portion having an axis displaceable eccentrically with respect to the axis of the sleeve, means for fastening said upper portion to the sleeve in each eccentric position of said portion, said upper portion having a bore in its peripheral zone, a vertical pivot in said bore having the axis parallel to the axis of the sleeve, a flask-carrying plate, a plurality of pairs of pulleys on said flask carrying plate, the pulleys of each pair being at diametrically opposite sides of said flask carrying plate, a plurality of pulleys on said frame, one opposed to each of the pulleys on said flask carrying plate, thus forming pairs of opposed pulleys, a plurality of annular spiral springs, one around each pair of opposed pulleys and connecting said flask-carrying plate to said frame, said plate having a support in the lower central zone thereof, a ball bearing carried on said vertical pivot and penetrating said support, ball members positioned between said frame and said flask-carrying plate for supporting said plate during the motion thereof, and motor means carried by said frame and connected to said rotatable sleeve for rotating said sleeve relative to said frame.

References Cited in the file of this patent

UNITED STATES PATENTS

| | | |
|---|---|---|
| 811,426 | Mitchell | Jan. 30, 1906 |
| 1,540,355 | Mathes | June 2, 1925 |
| 2,192,233 | Mack | Mar. 5, 1940 |